(12) United States Patent
Hinkle et al.

(10) Patent No.: US 11,054,069 B1
(45) Date of Patent: *Jul. 6, 2021

(54) COMPACTABLE PIPE T FOR POLY IRRIGATION TUBING

(71) Applicants: Billy Don Hinkle, Moro, AR (US); Blaine McCoy, Palestine, AR (US)

(72) Inventors: Billy Don Hinkle, Moro, AR (US); Blaine McCoy, Palestine, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,059

(22) Filed: Sep. 12, 2019

Related U.S. Application Data

(63) Continuation-in-part of application No. 15/496,696, filed on Apr. 25, 2017, now Pat. No. 10,563,798.

(51) Int. Cl.
*F16L 21/06* (2006.01)

(52) U.S. Cl.
CPC .................... *F16L 21/06* (2013.01)

(58) Field of Classification Search
CPC ............ F16L 31/02; F16L 47/32; F16L 21/06
USPC ....................................................... 285/200
See application file for complete search history.

(56) References Cited

U.S. PATENT DOCUMENTS

| | | |
|---|---|---|
| 1,695,822 A | 12/1928 | Restein |
| 2,245,037 A | 6/1941 | Hersey, Jr. .................. 285/71 |
| 2,322,937 A * | 6/1943 | Holthouse ............... F16L 11/20 285/55 |
| 2,775,806 A | 1/1957 | Love .............................. 24/271 |
| D208,388 S | 8/1967 | Graham .............................. 91/3 |
| 3,927,464 A | 12/1975 | Wallsten .......................... 29/454 |
| 4,207,918 A | 6/1980 | Burns et al. ................... 137/375 |
| 4,465,330 A | 8/1984 | DeCenzo ......................... 339/14 |
| 4,957,792 A * | 9/1990 | Shizuo .................... B29C 35/06 138/122 |
| 5,027,862 A | 7/1991 | Laybourn ........................ 138/99 |
| 5,366,263 A | 11/1994 | Hendrickson ................. 285/364 |
| 5,380,052 A | 1/1995 | Hendrickson ................. 285/364 |
| 5,403,120 A * | 4/1995 | Stekette, Jr. ............ B26D 3/163 405/184.2 |
| 5,540,465 A | 7/1996 | Sisk .............................. 285/365 |
| 5,620,210 A | 4/1997 | Eyster et al. .................... 285/81 |
| D386,246 S | 11/1997 | Sonden et al. .................. 23/262 |
| 5,722,666 A | 3/1998 | Sisk .............................. 277/101 |
| 6,089,276 A | 7/2000 | Miyazaki et al. .............. 138/98 |
| 6,170,883 B1 | 1/2001 | Mattsson et al. ............. 285/110 |
| 6,425,608 B1 | 7/2002 | Nordstrom ..................... 285/374 |
| D504,503 S | 4/2005 | Thurman ........................ 23/393 |
| 7,004,511 B2 | 2/2006 | Barron et al. ................. 285/342 |
| 7,222,888 B1 | 5/2007 | Piety et al. .................... 285/260 |
| D614,271 S | 4/2010 | Weston .......................... 23/269 |
| D625,783 S | 10/2010 | Madara .......................... 23/262 |
| D629,496 S | 12/2010 | Madara et al. ................. 23/262 |
| D654,785 S | 2/2012 | Clorley ............................ 8/396 |
| D703,032 S | 4/2014 | Bigdeliazari ..................... 8/396 |
| D703,033 S | 4/2014 | Karlsson .......................... 8/396 |
| 8,720,955 B2 | 5/2014 | Untch ........................... 285/365 |

(Continued)

FOREIGN PATENT DOCUMENTS

DE 2630964 A1 1/1978 ............. F16L 17/04

*Primary Examiner* — Matthew Troutman
*Assistant Examiner* — James A Linford
(74) *Attorney, Agent, or Firm* — Keisling & Pieper PLC; David B. Pieper; Trent C. Keisling

(57) ABSTRACT

A compactable lay flat T joint and clamping system apparatus and method for compaction and deployment are disclosed.

4 Claims, 18 Drawing Sheets

(56) References Cited

U.S. PATENT DOCUMENTS

| | | | |
|---|---|---|---|
| D715,412 S | 10/2014 | Sgherri | 23/1 |
| D723,362 S | 3/2015 | Bacon | 8/396 |
| D728,757 S | 5/2015 | Graham | 23/269 |
| D737,133 S | 8/2015 | Sandman et al. | 8/396 |
| D779,315 S | 2/2017 | Hinkle | 8/396 |
| 2003/0023824 A1 | 1/2003 | Wooldridge | 711/170 |
| 2003/0085567 A1 | 5/2003 | Oney et al. | 285/133.5 |
| 2003/0197381 A1 | 10/2003 | Lehnhardt | 285/364 |
| 2005/0016372 A1 | 1/2005 | Kilvert | 89/1.34 |
| 2005/0023824 A1 | 2/2005 | Breay et al. | 285/53 |
| 2006/0097524 A1 | 5/2006 | Stolzman | 292/256.69 |
| 2006/0130753 A1 | 6/2006 | Driver et al. | 118/423 |
| 2006/0220395 A1 | 10/2006 | Kuzelka | 292/256.69 |
| 2008/0185064 A1 | 8/2008 | Kolzumi et al. | 138/126 |
| 2009/0084458 A1 | 4/2009 | Lin | 138/128 |
| 2009/0095355 A1 | 4/2009 | Kiest, Jr. | 137/15.01 |
| 2009/0294449 A1 | 12/2009 | Taylor | 220/321 |
| 2010/0038902 A1 | 2/2010 | Sandman et al. | 285/337 |
| 2010/0117360 A1 | 5/2010 | Chan | 285/373 |
| 2015/0285419 A1 | 10/2015 | Hinkle | 16/31 |

\* cited by examiner

COMPACTABLE PIPE T FOR POLY IRRIGATION TUBING

CROSS-REFERENCE TO RELATED APPLICATIONS

This application claims priority to and is a continuation-in-part of U.S. Utility application Ser. No. 15/496,696, filed on Apr. 25, 2017 entitled Overcenter Pipe Clamp and Method for Lay Flat Tubing which is a continuation in part of U.S. Utility application Ser. No. 14/920,216, filed on Oct. 22, 2015 entitled Overcenter Pipe Clamp and Method for Lay Flat Tubing which is a continuation in part of U.S. Utility application Ser. No. 14/246,840, filed on Apr. 7, 2014 entitled Overcenter Pipe Clamp and Method for Lay Flat Tubing; a continuation in part of U.S. Design application 29/487,247, filed on Apr. 7, 2014 by Hinkle entitled Outer Pipe Clamp Ring; and a continuation in part of U.S. Provisional Application 62/067,126 filed on Oct. 22, 2014 by Hinkle et al. entitled Compactable Pipe T for Poly Irrigation Tubing. Each of these applications are hereby incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in a T fitting and pipe clamp for a flexible lay flat tubing such as that used in row crop irrigation systems. More particularly, the invention relates to improvements particularly suited for connecting a compactable T fitting and applying appropriate pressure to the connections without tearing or otherwise damaging the tubing.

2. Description of the Known Art

As will be appreciated by those skilled in the art, T fittings and pipe clamps are known in various forms. However, it is not known how to provide compactable fittings and quickly attach low pressure irrigation tubing without tearing or damaging the tubing.

Poly lay flat flexible irrigation tubing 10 is a polyethylene tubing used with irrigating row crops in level grade farming sold under trade names like POLYPIPE or DURAPIPE. Poly-Pipe lay-flat flexible tubing is a long, generally one thousand foot or more, seamless tube packaged flattened in convenient rolls which can be unwound from the back of a vehicle or manually. Poly-Pipe lay-flat flexible tubing is not designed to transfer water over hills or up grades. This is an extremely low cost temporary irrigation system for use in irrigating fields. Typically provided in diameters of 7, 9, 10, 12, 15, or 18 inches and a thickness of 7 or 10 mil. It is designed for high volume low pressure flows and is not designed for use in moving water uphill or over berms. Thus, unlike flexible pipes used on fire trucks, poly pipe is not designed for high pressure and is not provided with couplings or connectors because it has to be cut to length in the field. In typical applications, miles of pipe are laid in the spring and taken up and recycled each fall. Because the pipe is provided in short sections, hundreds, if not thousands of connections may have to be done each spring and then removed each fall. The fittings used for the poly lay flat flexible irrigation tubing are standard rigid corrugated or solid rigid wall pipe. These rigid connections require additional trailers for the bulk of the connections and transportation expenses and time.

Patents disclosing information relevant to pipe clamps include: U.S. Pat. No. 5,722,666, issued to Sisk on Mar. 3, 1998, entitled Pipe coupler gasket with triangular sealing ridges; U.S. Pat. No. 5,540,465, issued to Sisk on Jul. 30, 1996 entitled Pipe, valve and/or tee coupler; U.S. Pat. No. 5,380,052, issued to Hendrickson on Jan. 10, 1995 entitled Releasable handle-type fastener for pipe couplings; and U.S. Pat. No. 5,366,263, issued to Hendrickson on Nov. 22, 1994 entitled Releasable fastener for pipe couplings. Each of these patents is hereby expressly incorporated by reference in their entirety. From these prior references it may be seen that these prior art patents are very limited in their teaching and utilization, and an improved over center pipe clamp is needed to overcome these limitations.

SUMMARY OF THE INVENTION

The present invention is directed to an improved T shaped fitting that is compactable into a roll form and can be installed with small center pipe clamps. The pipe clamps use an inner ring, outer ring with extending arms and compression fingers, and an over center clamp. In accordance with one exemplary embodiment of the present invention, The t fitting can be rolled into a cylinder similar to a roll of paper or bathroom tissue and then can be expanded in the field for the connections. An over center pipe clamp is provided using a clamping segments and spacing segments to provide high gripping force sufficient for use with thin wall tubing while providing a low pressure sealing force in a quick installation and quick removal pipe clamp. A method for installing the T fitting is taught so that the interior of the pipe flow is not impeded with flapping or exposed end sections. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
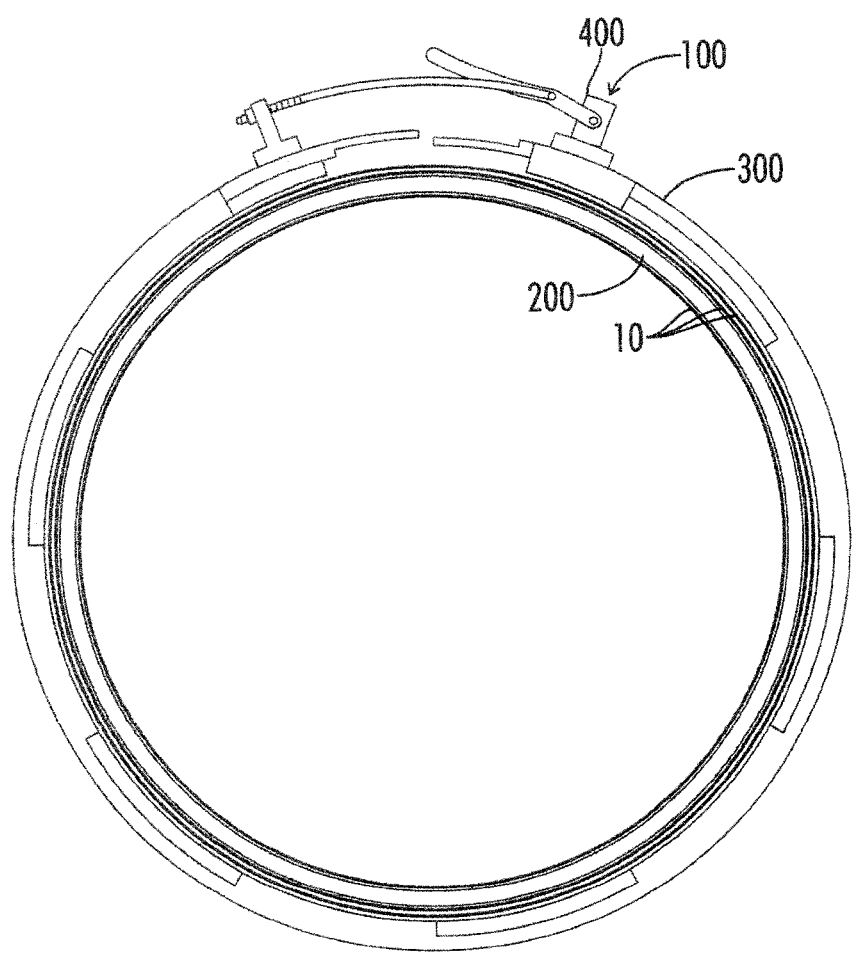
FIG. 1 is a schematic front view of the overcenter pipe clamp with extending compression fingers of the present invention.
Figure 2:
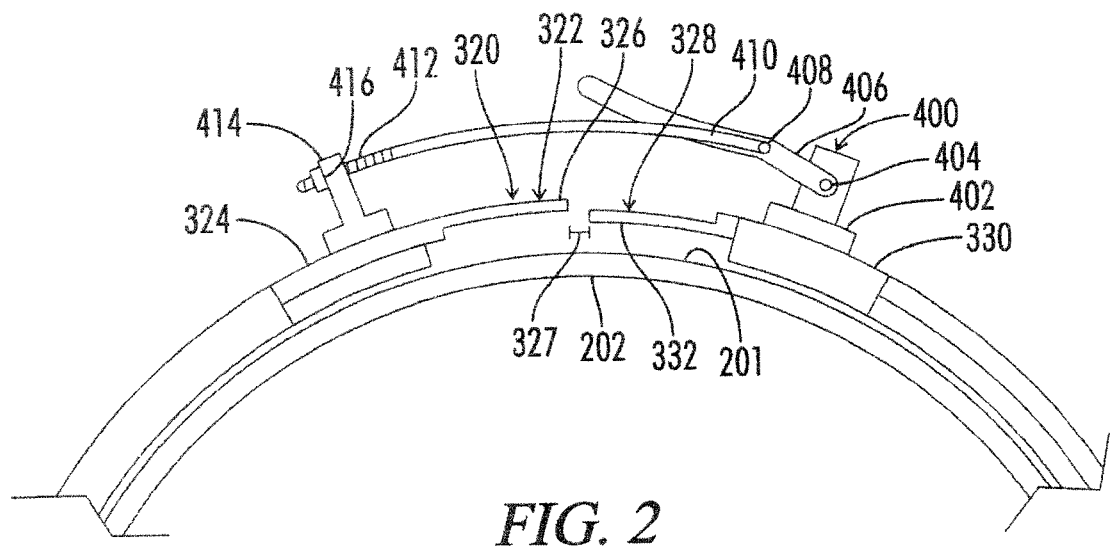
FIG. 2 is a larger view of the overcenter pipe clamp of FIG. 1 showing an open position.
Figure 3:
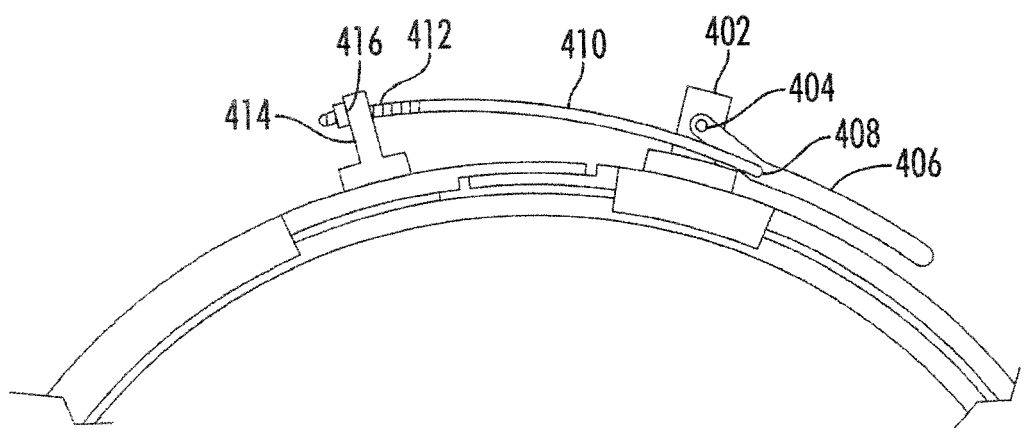
FIG. 3 is a larger view of the overcenter pipe clamp of FIG. 1 showing a closed position.
Figure 4:
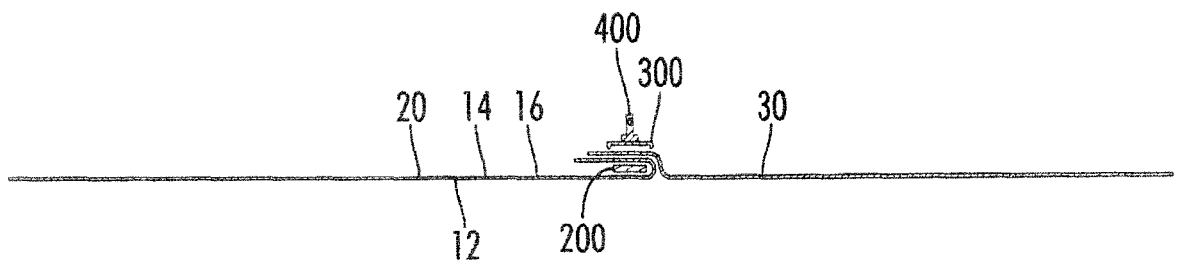
FIG. 4 is a cutaway view of the overcenter pipe clamp of FIG. 1 showing the first and second pipe ends with the clamp in an open position.
Figure 4:
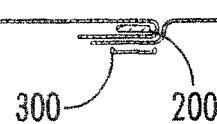
Figure 5:
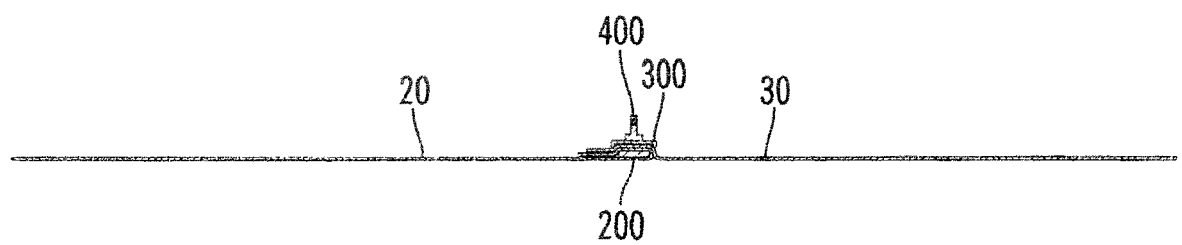
FIG. 5 is a side cutaway view of the overcenter pipe clamp of FIG. 1 showing the first and second pipe ends with the clamp in a closed position.
Figure 5:

As shown in FIGS. 1 through 30 of the drawings, one exemplary embodiment of the present invention is generally shown as a compactable poly tubing T joint 1000 for poly tubing irrigation systems. We begin our discussion with the clamp 100 and then review the joint 1000.

FIGS. 1 through 21 show various assemblies and parts for the lay flat pipe quick clamp 100 for poly lay flat flexible irrigation tubing 10. FIGS. 1, 4, 5, 6, and 7 show the poly lay flat flexible irrigation tubing 10 with a pipe inner surface 12, non-structural collapsing pipe wall 14 with a cracking or minimum bend 15, and a pipe outer surface 16. The minimum bend 15 is the sharpest radius that may be used without cutting or tearing the tubing 10. A first tubing end 20 and second tubing end 30 are shown for clamping.

As shown in FIGS. 1 through 7 of the drawings the lay flat pipe quick clamp 100 is constructed from an inner shape ring 200, an outer split ring 300, and an overcenter clamp 400.

The inner shape ring 200 includes an inner flow surface 202 between a left folding edge 204 and a right folding edge 206 so that either direction of flow may be utilized in the tubing 10. Each folding edge 204, 206 has a minimum folding radius 208 greater than the minimum bend 15 of the tubing. The inner shape ring 200 also includes an outside clamping surface 210 that is used to contact the tubing 10 and compressably secure it in position. The outside clamping surface 210 defines width for the ring clamping surface 201. In this embodiment, the ring clamping surface 201 extends from the left folding edge 204 to the right folding edge 206. The outer split ring 300 includes an inside clamping surface 302 that works with the outside clamping surface 210 of the inner ring 200 to compressably, sealably, and frictionally hold the tubing 10 in position. The outer split ring 300 includes a left capturing edge 304 and right capturing edge 306. Each capturing edge 304, 306 is shown with multiple capturing segments 308 alternating with multiple spacing segments 318 around the outer ring 300. Each capturing segment 308 includes an extending arm 310 reaching out an extending distance 311 to support a catch finger 312. Each catch finger is made with a finger depth 314 terminating at a finger tip 315 with a tip radius 316 greater than the minimum bend 15 of the tubing 10. If the left edge is provided with a capturing segment 308 then the preferred embodiment uses a spacing segment 318 on the right edge. These alternating sections and opposite alternating sides provide gripping while flexing alternating sides of the outer ring 300 to prove the downward force without harming the thin wall of the tubing 10. In this manner, only one half of the gripping force is applied on one side of the outer ring 300 such that the tubing is not exposed to a continuous or circular point load to stress the rubbing 10.

The outer ring 300 is split at an adjustable joint 320. The adjustable joint 320 includes a left ring end 322 with a left clamping surface 324 and a left sliding overlap finger 326 separated by a ring gap 327 to a right ring end 328 with a right clamping surface 330 and a right sliding overlap finger 332.

The adjustable joint is opened, closed, and secured by an overcenter clamp 400. The overcenter clamp is built off of a base handle riser 402 connected to the right ring end 328 by rivets, glue or the other securing method. The base handle riser 402 includes a handle pivot 404 that pivotally supports a layflat pipe clamp handle 406 the is positioned to be able to provide an over center clamping force to lock the handle in position. The handle 406 includes an arm pivot 408 connecting an extending catch arm 410 with a length adjuster 412 for engaging a catch slot 416 in a catch riser 414 secured to the left ring end 322.

Figure 6:
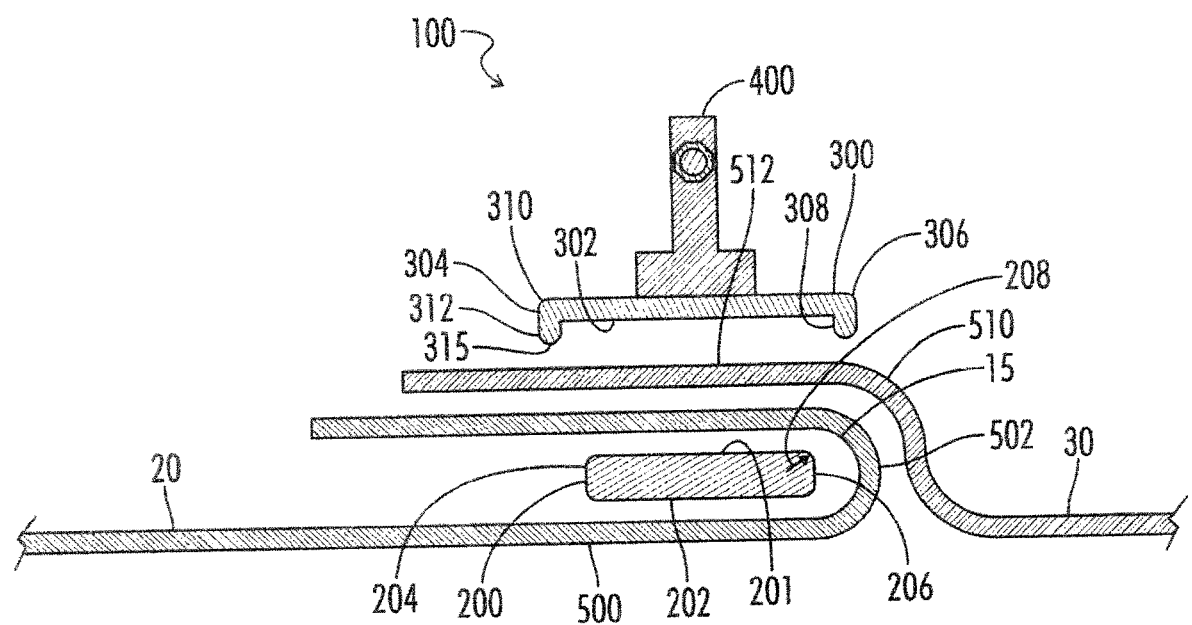
FIG. 6 is a larger side cutaway view of the first and second pipe ends with the clamp in an open position.
Figure 7:
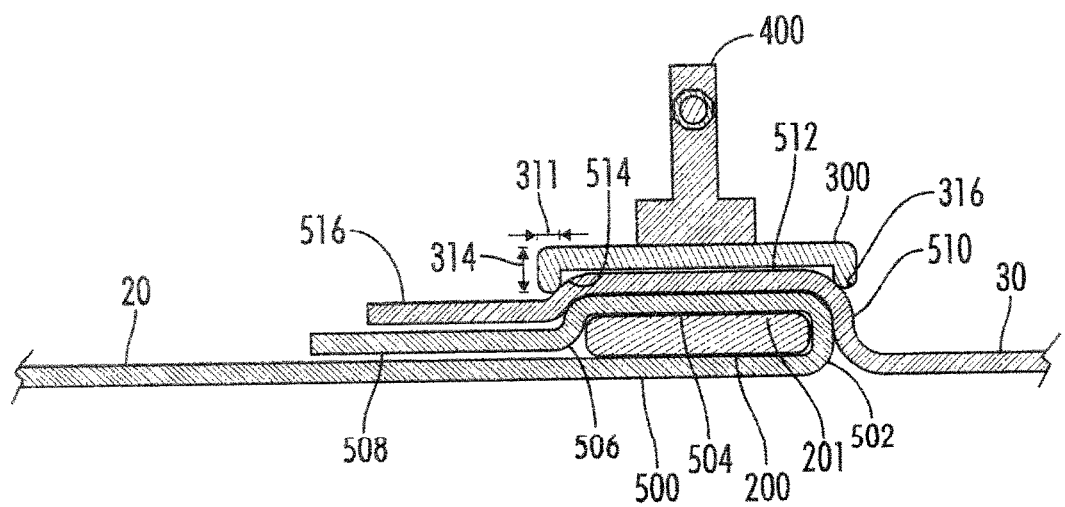
FIG. 7 is a larger side cutaway view of the first and second pipe ends with the clamp in a closed position.
Figure 8:
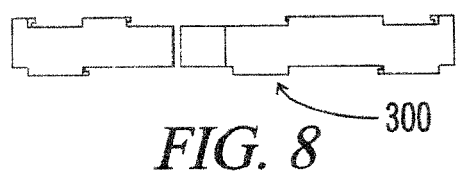
FIG. 8 is a top view of the outer ring.
Figures 9, 10, 11:
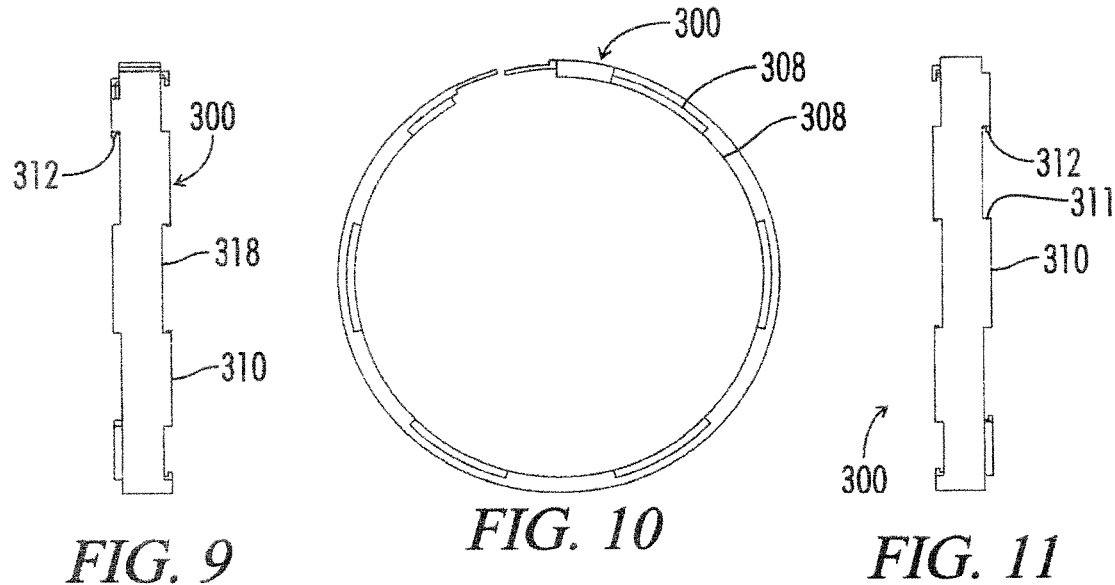
FIG. 9 is a left side view of the outer ring.
FIG. 10 is a front view of the outer ring.
FIG. 11 is a right side view of the outer ring.
Figure 12:
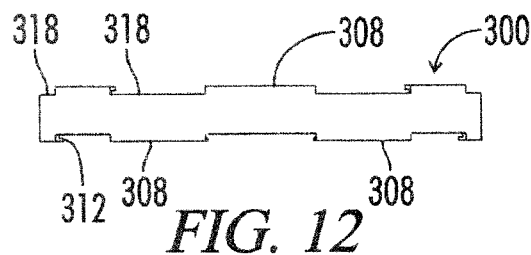
FIG. 12 is a bottom view of the outer ring.
Figure 13:
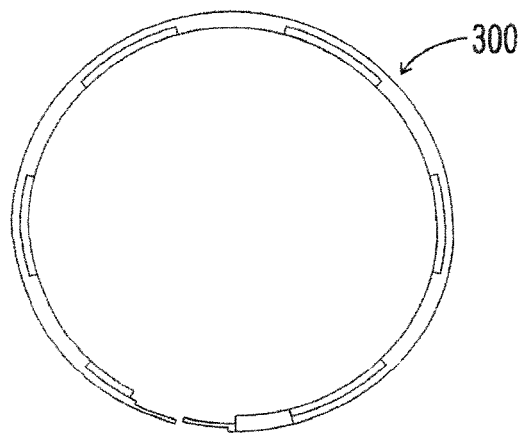
FIG. 13 is a back view of the outer ring.
Figure 14:
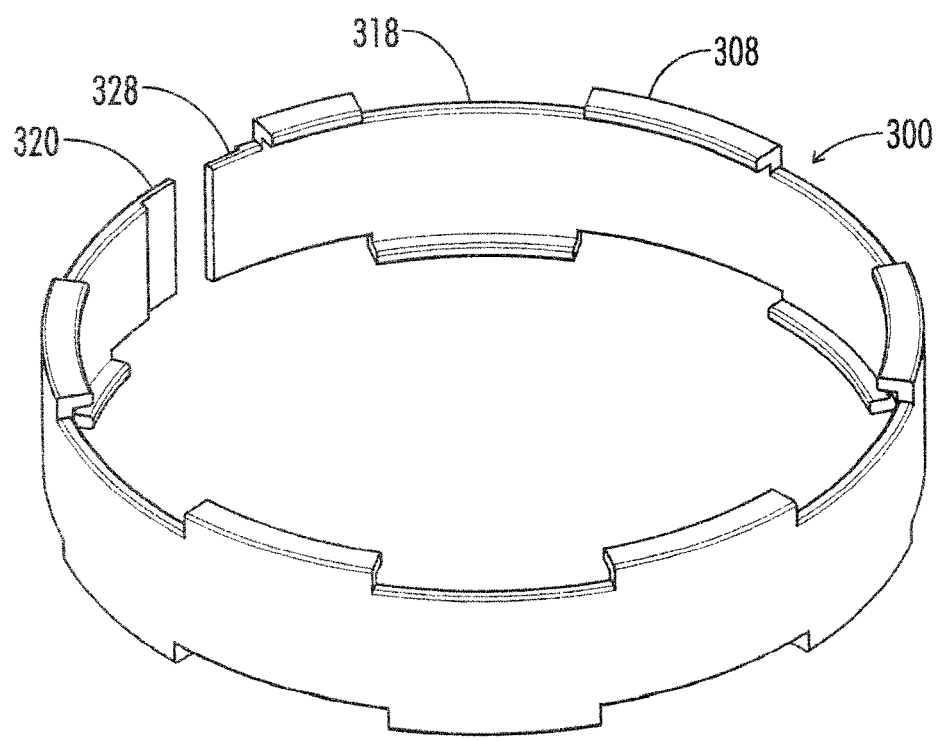
FIG. 14 is an isometric view of the outer ring.
Figure 15:
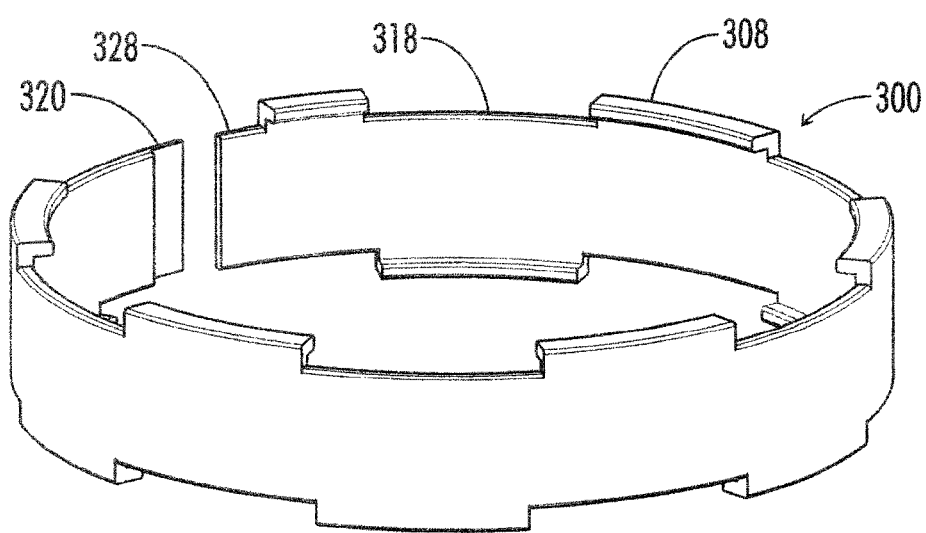
FIG. 15 is another angle of an isometric view of the outer ring.
Figure 16:
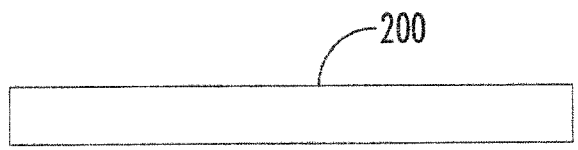
FIG. 16 is a top view of the inner ring.
Figures 17, 18, 19:
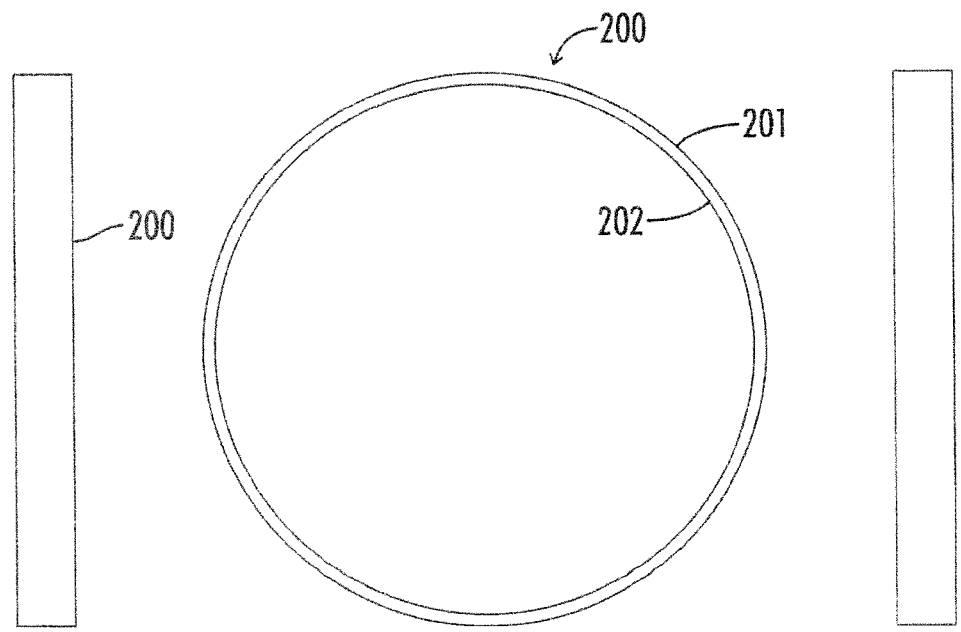
FIG. 17 is a left side view of the inner ring.
FIG. 18 is a front view of the inner ring, the back view being the same.
FIG. 19 is a right side view of the inner ring.
Figure 20:
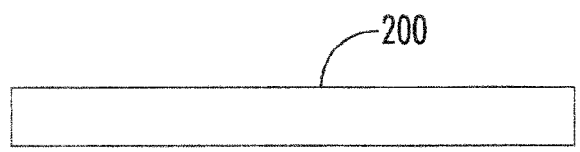
FIG. 20 is a bottom view of the inner ring.
Figure 21:
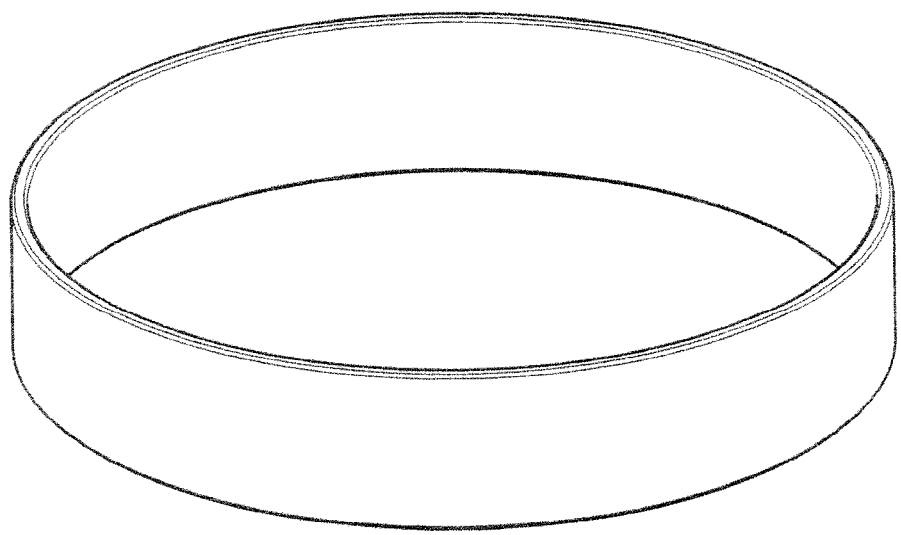
FIG. 21 is an isometric view of the inner ring.

As best seen in FIGS. 6 and 7, the first tubing end 20 is passed through the inner flow surface 202 of the inner ring 200 to form a first pipe through section 500. The first tubing 20 is then folded back upon itself to form a first pipe rise deflection section 502 and then passes back over the ring clamping surface 201 to form a first pipe center span section 504, first pipe drop deflection section 506, and first pipe overage section 508. The second tubing end 30 is positioned over the installed first tubing end 20 to form a right pipe rise deflection section 510, a right pipe center span section 512, a right pipe drop deflection section 514, and a right pipe overage section 516. As can be noted by FIGS. 6 and 7, the inner ring and outer ring provide a wide clamping surface to seal and frictionally engage the tubing 10 and hold it in position with additional force provided by the capturing segments 308. The extending arm 310 allows for an flexing pressure to be absorbed and applied to the catch finger 312. The ring material for the outer ring 300 should be selected to allow for this flexible pressure to be applied to the catch finger 312 and the finger depth 314 should be selected to provide the requisite force based on the thickness of the tubing 10 to secure the tubing 10 in place without tearing the tubing 10.

Figure 22:
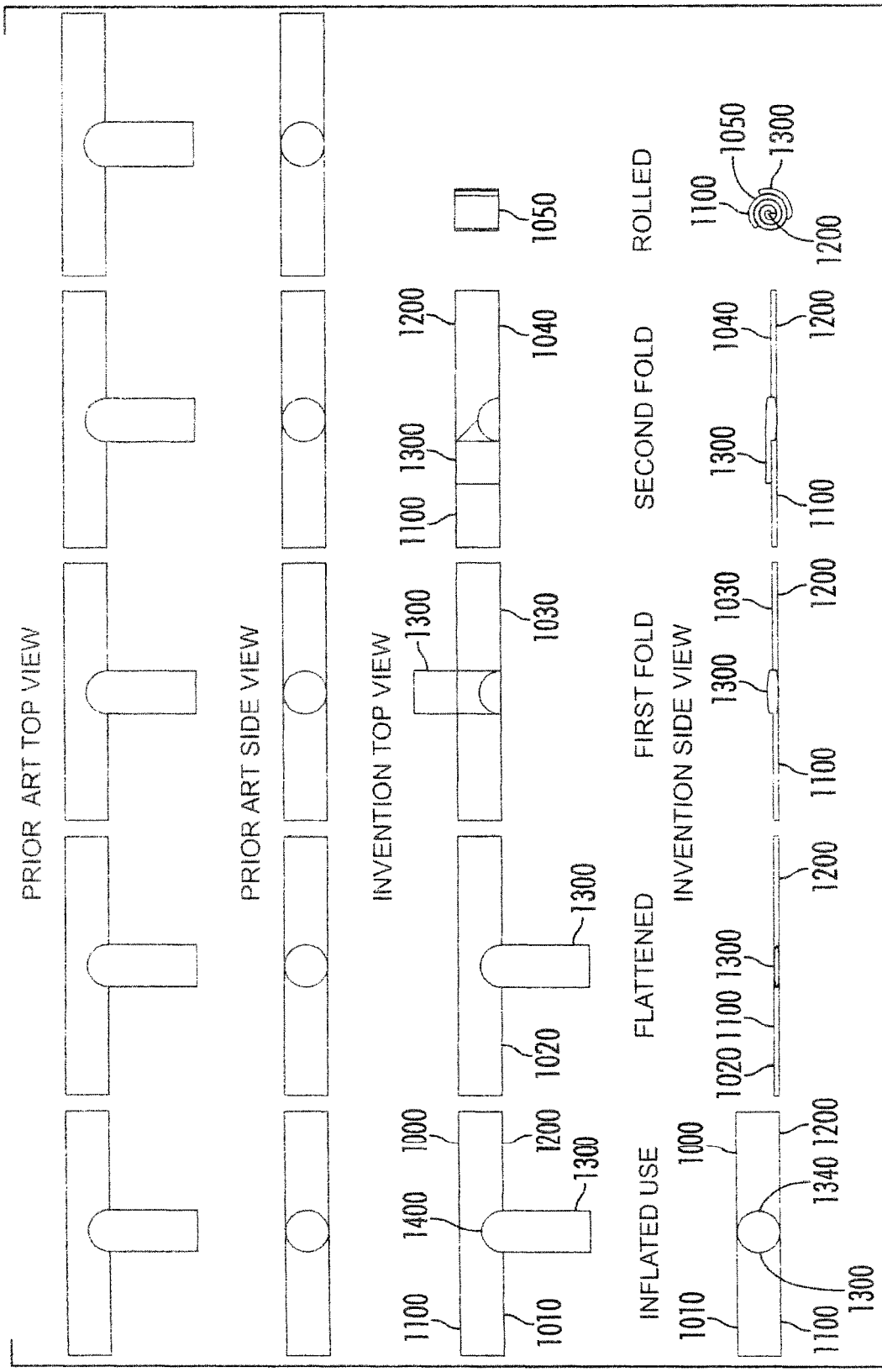
FIG. 22 is a schematic view comparing the solid prior art pipe joint against the present invention showing transformation of the inflated pipe being reduced to a compacted roll for shipping and storage.
Figure 23:
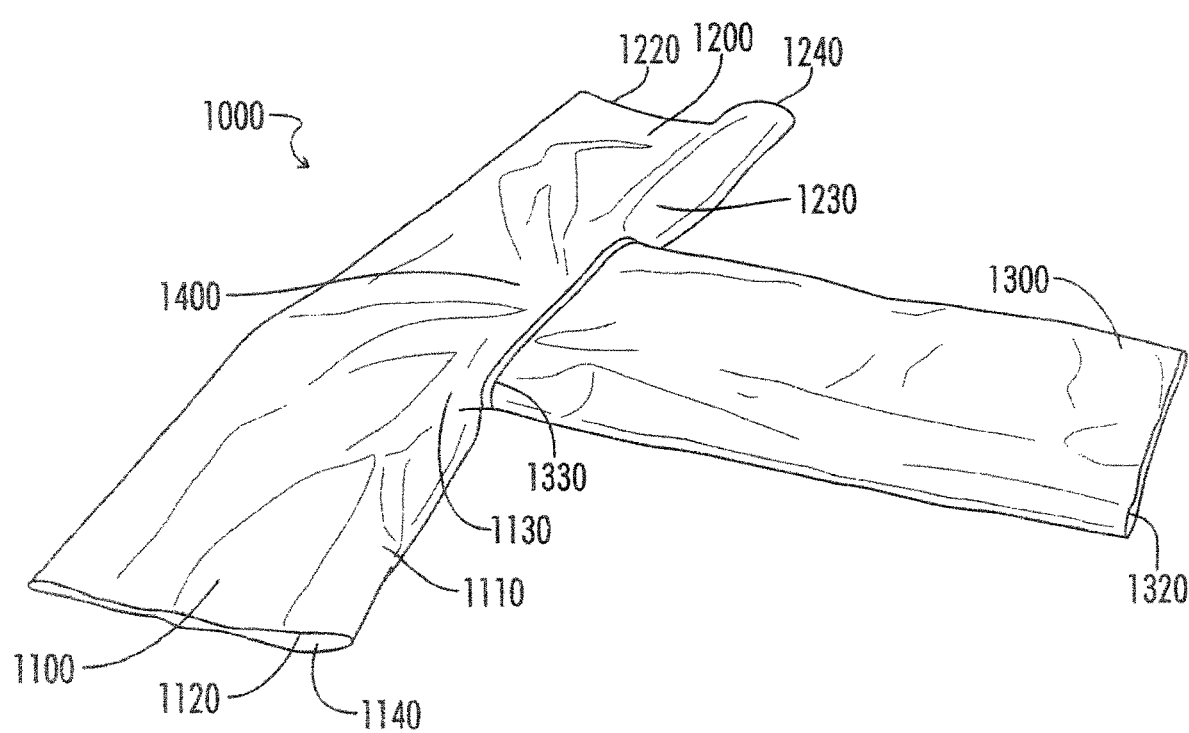
FIG. 23 is view of the flattened T pipe joint.
Figure 24:
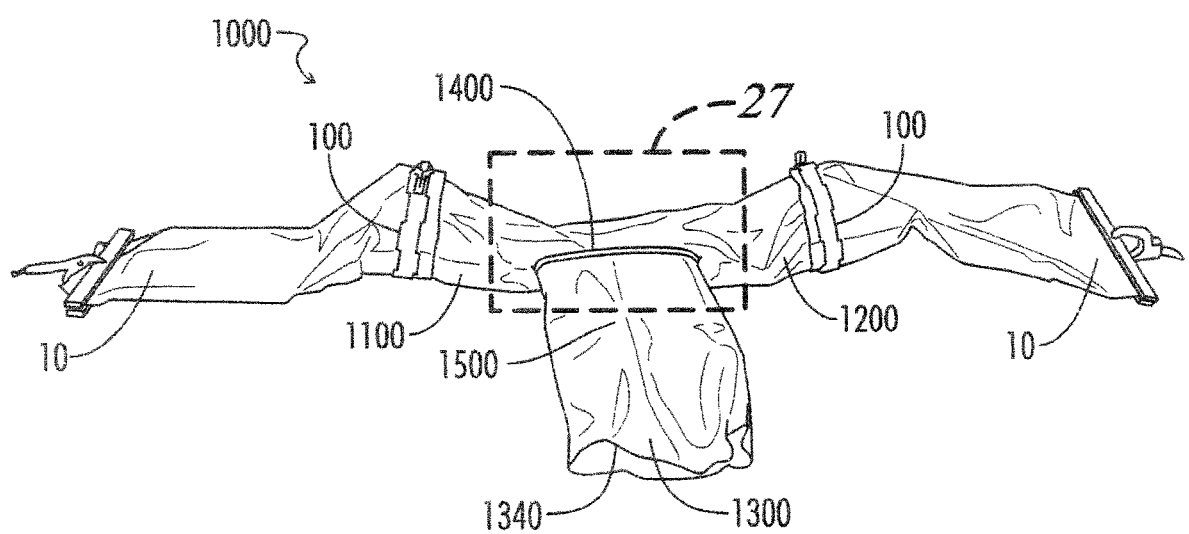
FIG. 24 is a view of the T pipe joint with shaping clamp connections
Figure 25:
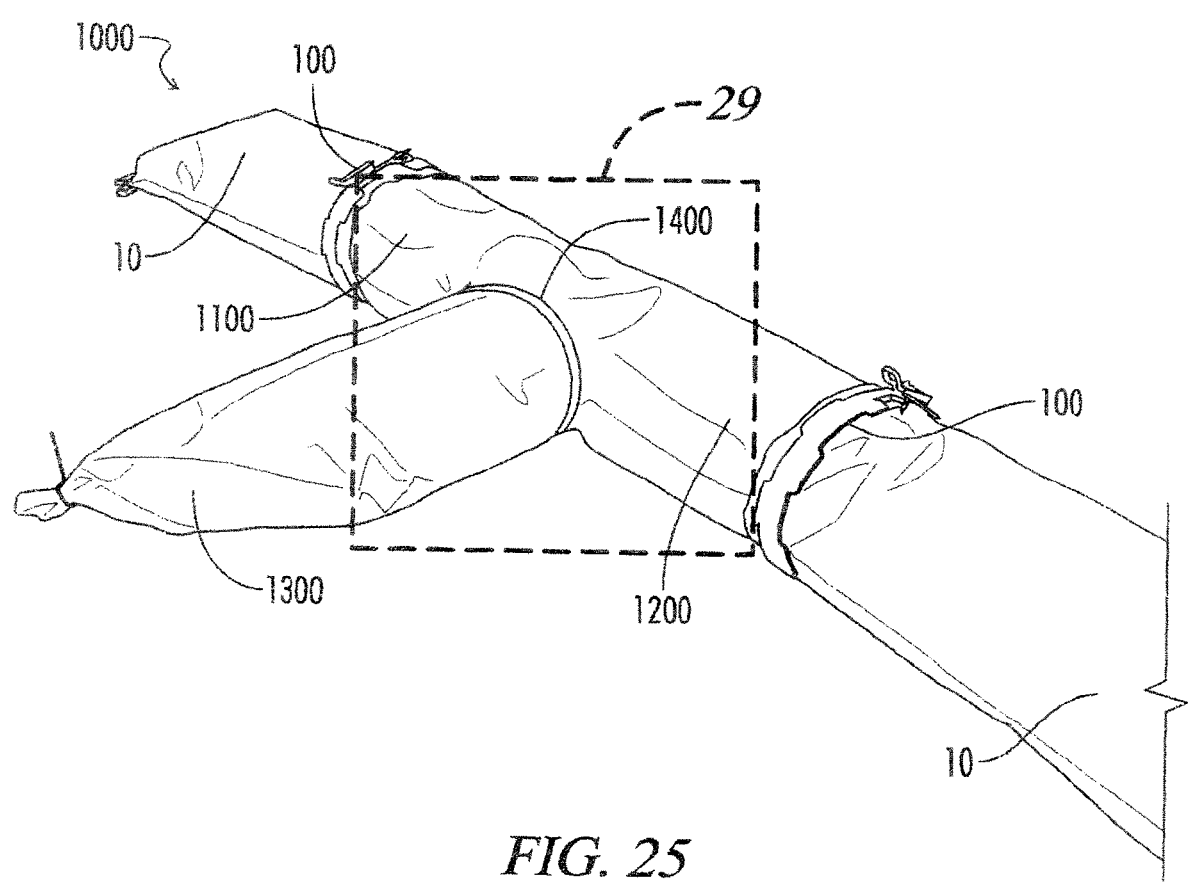
FIG. 25 is a back inflated view of the pipe joint.
Figure 26:
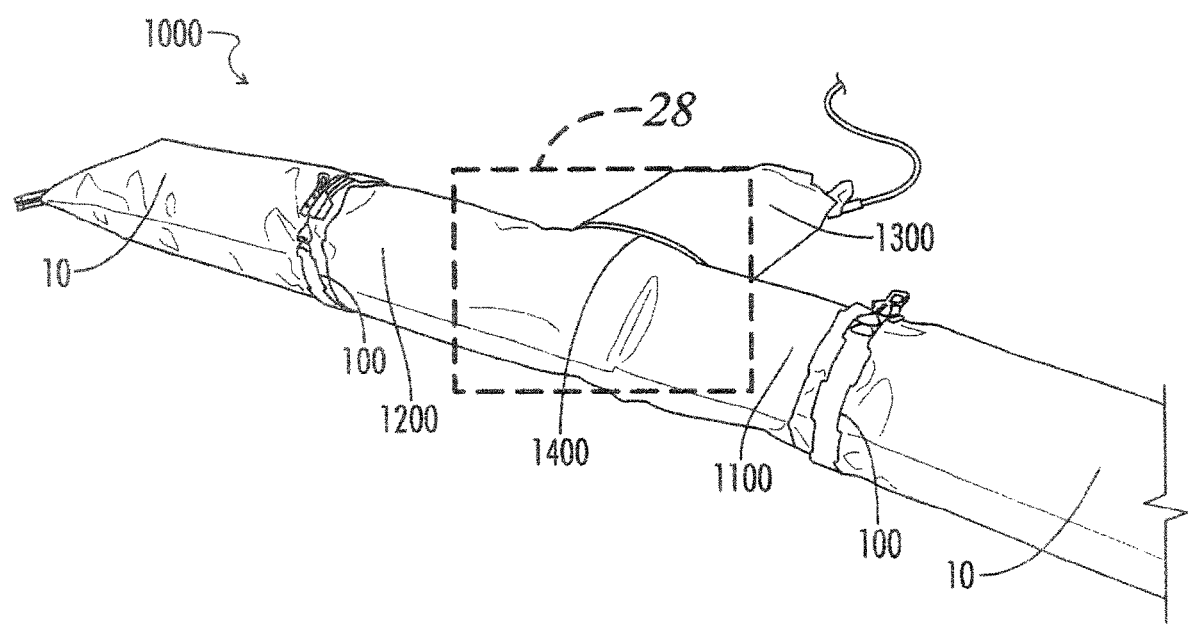
FIG. 26 is a front inflated view of the pipe joint.
Figure 27:
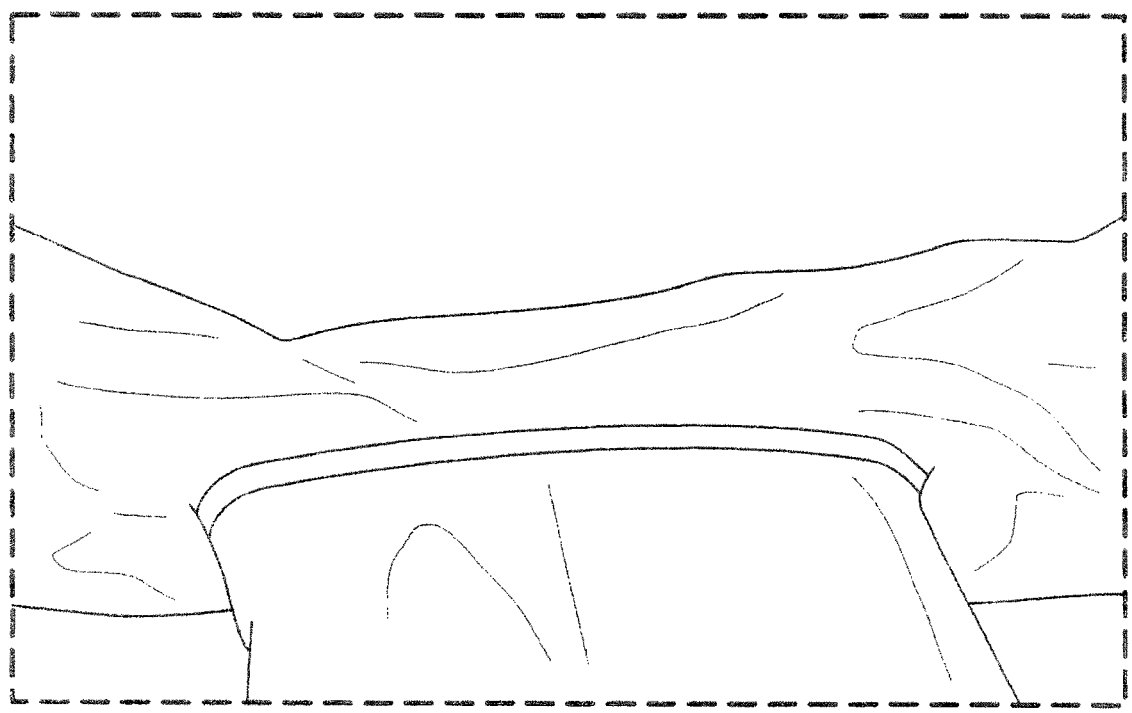
FIG. 27 is an enlarged view of the connecting joint.
Figure 28:
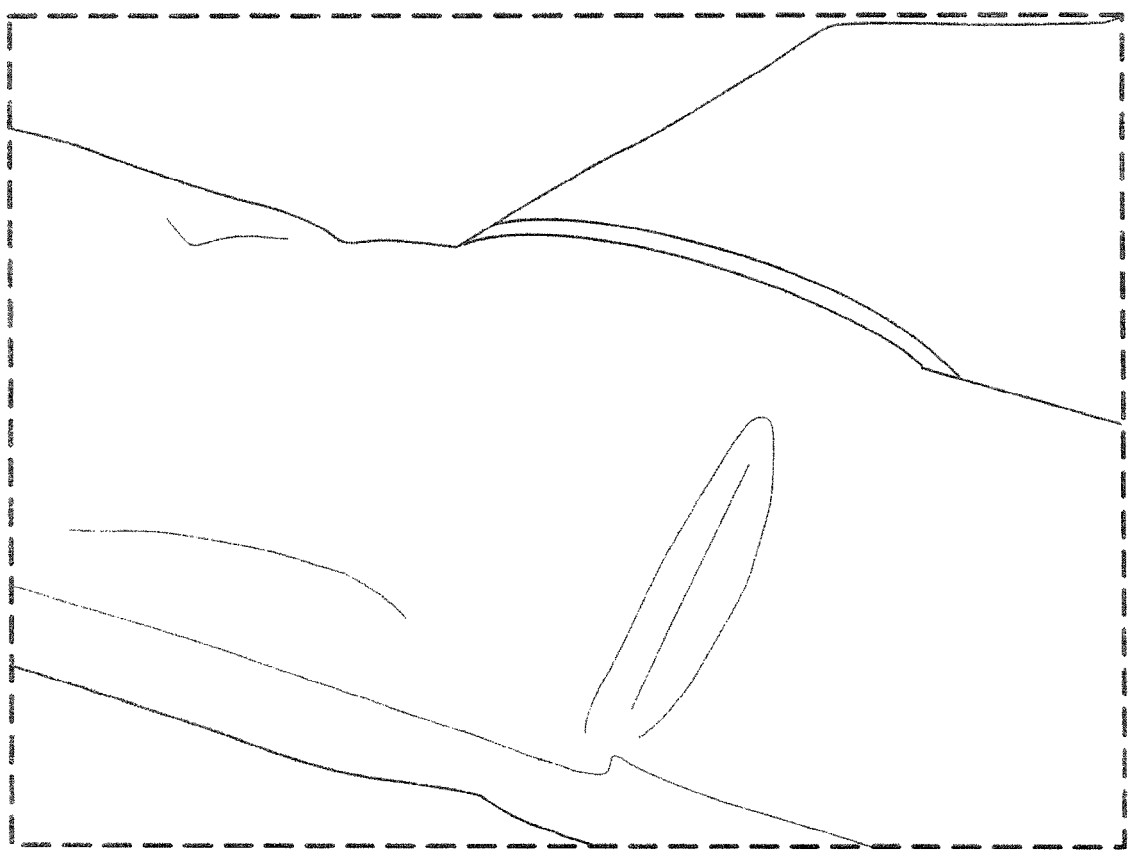
FIG. 28 is an enlarged view of the connecting joint.
Figure 29:
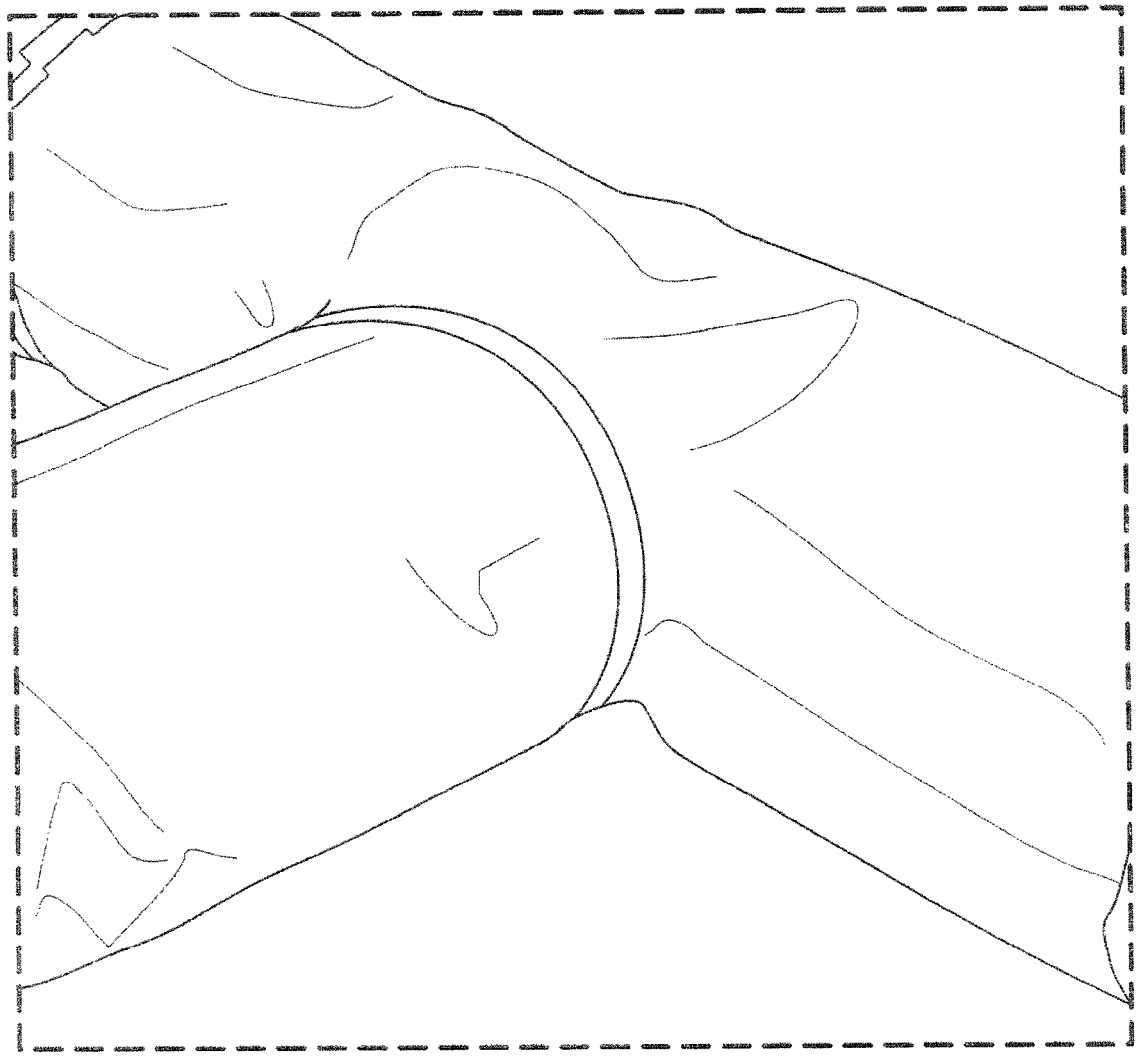
FIG. 29 is an enlarged view of the connecting joint.
Figure 30:
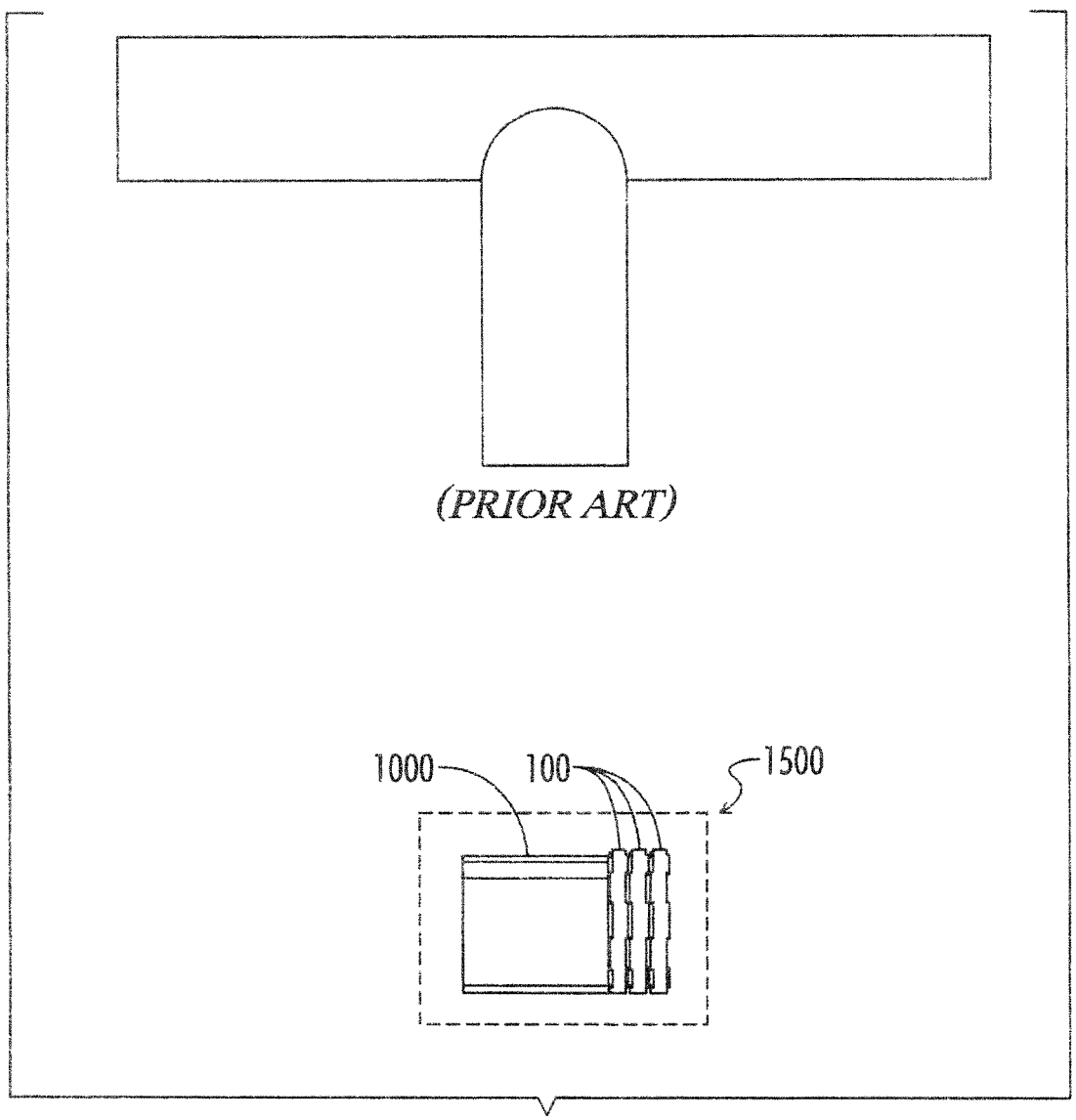
FIG. 30 is an comparison of the size of the prior art solid pipe joint against the compacted pipe joint kit of the present invention.

FIG. 22 is a schematic view comparing the old prior art solid pipe against the compactable T pipe joint 1000. The compactable T pipe joint 1000 is shown in an inflated state 1010, a flattened state 1020, a first compacted folded state 1030 where the third arm 1300 is compacted and folded back over the connecting joint 1400, a second compacted folded state 1040 where the third arm 1300 is compacted and folded to align with the linear arms 1100, 1200, and where all of the arms 1100, 1200, 1300 and the connecting joint 1400 are spirally rolled into a compacted roll state 1050 such that the compactable T pipe joint can be reduced to a compacted roll for shipping and storage. The compactable T pipe joint 1000 is formed with a first linear arm 1100, a second linear arm 1200, and a third perpendicular arm 1300 joined with a connecting joint 1400. The first linear arm 1100 includes a hollow connecting body 1110 extending from a connecting end 1120 to the central joint end 1130. The second linear arm 1200 includes a hollow connecting body 1210 extending from a connecting end 1220 to the central joint end 1230. The third linear arm 1300 includes a hollow connecting body 1310 extending from a connecting end 1320 to the central joint end 1330. The first connecting body 1110 defines a first flow aperture 1140. The second connecting body 1210 defines a second flow aperture 140. The third connecting body 1310 defines a third flow aperture 1340. The flow apertures 1140, 1240, 1340 are all interconnected to form the interior flow section of the t joint 1000. For the preferred embodiment, the compactable T pipe joint 1000 is molded from continuous polyethylene. Alternative embodiments can use an overlapping tab or ring of material that is then glued or welded for connection of the tubing arms 1100, 1200, 1300, to form the joint 1400. Regardless of the nature of the joint, the pipe joint 1000 must be flexible to allow for folding and rolling compaction of the joint. FIG. 23 is view of the flattened compactable T pipe joint 1000 showing a prototype unit with a welded pipe joint 1400. FIG. 24 is a view of a pipe joint kit 1500 installed to two sections of pipe 10. The pipe joint kit 1500 includes the flexible T pipe joint 100, and at least one lay flat pipe quick clamp 100. In the embodiment shown in FIG. 24, two lay flat pipe quick clamps 100 are provided. The compactable T pipe joint 1000 uses the shaping clamps 100 for connections to poly lay flat flexible irrigation tubing 10. Here, the tubing 10 and one end of the compactable T pipe joint 1000 are clamped closed to be able to show the inflated state such as when water is flowing through the tubing 10 and compactable T pipe joint 1000. FIG. 25 is a back inflated view of the compactable T pipe joint 1000 and FIG. 26 is a front inflated view of the compactable T pipe joint 1000. FIGS. 27, 28, and 29 show an enlarged view of the overlapped and glued version of the connecting joint. FIG. 30 shows a size comparison of the shipping, storage, and handling size of the bulky solid prior art pipe joint versus the compacted T pipe joint kit 1500 of the present invention with the compactable T pipe joint 1000 shown in a compacted roll state 1050 with three clamps 100. In this compacted T pipe joint kit 1500 arrangement, five T pipe joint kits 1500 can be handled in the same space as one of the solid pipe prior art pipe joints.

Reference numerals used throughout the detailed description and the drawings correspond to the following elements:
Poly lay flat flexible irrigation tubing 10
Pipe inner surface 12
Non-structural collapsing pipe wall 14
Pipe outer surface 16
First tubing end 20
Second tubing end 30
Lay flat pipe quick clamp 100
Inner shape ring 200
Timer flow surface 202
Ring clamping surface 201
Left Folding edge 204
Right folding edge 206
Folding radius 208
Outside clamping surface 210
Outer split ring 300
Inside clamping surface 302
Left Capturing edge 304
Right capturing edge 306
Capturing segment 308
Extending arm 310
Extending distance 311
Catch finger 312
Finger depth 314
Finger tip 315
Tip radius 316
Spacing segment 318
Adjustable joint 320
First ring end 322
First clamping surface 324
First sliding overlap finger 326
Ring gap 327
Right ring end 328
Right clamping surface 330
Right sliding overlap finger 332
Overcenter clamp 400
Handle riser 402
Handle pivot 404
Layflat pipe clamp handle 406
Arm pivot 408
Extending catch arm 410
Length adjuster 412
Catch riser 414
Catch slot 416
First pipe through section 500
First pipe rise deflection section 502
First pipe center span section 504
First pipe drop deflection section 506
First pipe overage section 508
Second pipe rise deflection section 510
Second pipe center span section 512
Second pipe drop deflection section 514
Second pipe overage section 516
compactable T pipe joint 1000
inflated state 1010
flattened state 1020
first folded state 1030
second folded state 1040
compacted roll state 1050
first linear arm 1100
first hollow connecting body 1110
first connecting end 1120
first central joint end 1130
first flow aperture 1140
second linear arm 1200
second hollow connecting body 1210 second connecting end 1220
second central joint end 1230
second flow aperture 1240
third linear arm 1300
third hollow connecting body 1310
third connecting end 1320
third central joint end 1330
third flow aperture 1340
connecting joint 1400
compacted T pipe joint kit 1500

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A compacted T pipe joint kit for a flexible collapsing wall pipe with an interior and an exterior folded hack upon itself to form a center span section, comprising:
    a flexible and compactable t pipe joint in a compacted state, the flexible and compactable t pipe joint including at least one hollow connecting body including tubing arms with an overlapping ring of material, wherein the overlapping ring of material forms a joint of the tubing arms via a connection group which includes gluing and welding; and
    at least one pipe quick clamp, including an inner shape ring including an inner surface, at least one folding edge, and an outer clamping surface positioned inside both the flexible and compactable t pipe joint and the center span section;
    an outer split ring including a first ring end and a second ring end defining a ring gap, an inside clamping surface, and at least one capturing edge, the capturing edge including a catch finger; and
    an overcenter clamp connected to the first ring end and the second ring end across the ring gap to compressably, sealably, and frictionally clamp the at least one hollow connecting body between the outer clamping surface of the inner shape ring and the inside clamping surface of the outer split ring.

2. The kit of claim 1, the compactable t pipe joint and tubing arms comprising:
    a first linear arm;
    a second linear arm flowably connected to the first linear arm; and
    a third linear arm flowably connected to the first and second linear arms.

3. The kit of claim 2, the first, second, and third linear arms flexibly transformable between two states selected from the roll state group, the roll state group including a compacted roll state, a compacted folded state, a compacted flattened state, and an inflated state.

4. The kit of claim 3, the folded state including a first compacted folded state, a second compacted folded state, and a compacted roll state.

* * * * *